(12) United States Patent
Ueno et al.

(10) Patent No.: US 12,027,714 B2
(45) Date of Patent: Jul. 2, 2024

(54) BATTERY PROTECTION APPARATUS, VEHICLE, AND ATTACHMENT METHOD FOR BATTERY PROTECTION APPARATUS

(71) Applicant: HONDA MOTOR CO., LTD., Tokyo (JP)

(72) Inventors: Wataru Ueno, Wako (JP); Koji Shinohara, Guangzhou (CN); Hiroyuki Ozawa, Wako (JP); Takahiro Koizumi, Wako (JP); Shoshi Hidaka, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 351 days.

(21) Appl. No.: 17/529,453

(22) Filed: Nov. 18, 2021

(65) Prior Publication Data
US 2022/0158283 A1  May 19, 2022

(30) Foreign Application Priority Data
Nov. 19, 2020 (CN) .......................... 202011300145.5

(51) Int. Cl.
*H01M 50/242* (2021.01)
*H01M 50/202* (2021.01)
*H01M 50/249* (2021.01)

(52) U.S. Cl.
CPC ....... *H01M 50/202* (2021.01); *H01M 50/242* (2021.01); *H01M 50/249* (2021.01); *H01M 2220/20* (2013.01)

(58) Field of Classification Search
CPC ............. H01M 50/242; H01M 50/202; H01M 50/249; H01M 2220/20; B60K 2001/0438
See application file for complete search history.

(56) References Cited

U.S. PATENT DOCUMENTS

| 4,514,408 | A | * | 4/1985 | Nisato | C07D 211/46 546/261 |
| 6,193,306 | B1 | * | 2/2001 | Lee | B62D 25/025 296/205 |
| 7,401,669 | B2 | * | 7/2008 | Fujii | B60L 50/66 180/68.5 |
| 2009/0186266 | A1 | * | 7/2009 | Nishino | B60L 50/66 429/120 |
| 2010/0273040 | A1 | * | 10/2010 | Kubota | H01M 10/6563 429/100 |
| 2010/0307848 | A1 | * | 12/2010 | Hashimoto | B60K 1/04 180/68.5 |
| 2011/0139527 | A1 | * | 6/2011 | Bannier | H01M 50/264 180/68.5 |
| 2011/0284298 | A1 | * | 11/2011 | Ajisaka | B60H 1/00542 180/65.21 |

(Continued)

*Primary Examiner* — Jason D Shanske
*Assistant Examiner* — James J Triggs
(74) *Attorney, Agent, or Firm* — Amin, Turocy & Watson, LLP

(57) ABSTRACT

A battery protection apparatus fixed to a vehicle body and provided on a side surface of a battery pack, includes a first portion configured to be inclined toward the battery pack side from a lower side to an upper side; an extension portion configured to extend from a lower end of the first portion in a direction being apart from the battery pack; and a second portion provided between the first portion and the battery pack, wherein the first portion and the second portion forms a hollow portion.

11 Claims, 2 Drawing Sheets

(56) References Cited

U.S. PATENT DOCUMENTS

2013/0344377 A1* 12/2013 Ogasawara ........... H01M 50/55
429/158
2021/0170853 A1* 6/2021 Schmidt .............. H01M 50/209

* cited by examiner

BATTERY PROTECTION APPARATUS, VEHICLE, AND ATTACHMENT METHOD FOR BATTERY PROTECTION APPARATUS

CROSS-REFERENCE TO RELATED APPLICATION

The priority is claimed based on a Chinese Patent Application No. 202011300145.5, filed on Nov. 19, 2020. The content of the Chinese Patent Application is incorporated herein by reference.

TECHNICAL FIELD

The present disclosure relates to a technical field of a vehicle. More specifically, the present disclosure relates to a battery protection apparatus, a vehicle including the battery protection apparatus, and an attachment method for attaching the battery protection apparatus to the vehicle.

BACKGROUND ART

A battery pack is a core member of an electric vehicle. Due to the continuous increasing of the cruising distance, the volume of the battery pack becomes larger and it becomes popular to provide the battery pack under the body of the vehicle.

A lower surface of the battery pack is often lower than the lowest point of the chassis or the hanger bracket. During the period of the vehicle moving forward or backward, it is easy for a case of the battery pack to be collide with the obstacles on the ground so as to lead to a deformation or a damage of the battery pack and the cells inside the battery pack. Most of the battery protection apparatus for protecting the battery pack is configured to include a protection beam or a cushioning member on a side surface of the battery pack with respect to the direction in which the vehicle moves forward or backward so as to reduce the destructive power during the collision.

However, when the battery protection apparatus encounters the collision, the cushioning member receives the collision force and directly collides with the side surface of the battery pack and the collision force is concentrated at a specific point on the side surface of the battery pack such that the load at the specific position of the side surface becomes excessively large. As a result, the cushioning effect cannot be expected to be good and it is impossible to sufficiently protect the battery pack.

SUMMARY

An objection of the present disclosure is to provide a battery protection apparatus, a vehicle, and an attachment method for a battery protection apparatus to solve the problem that when the battery protection apparatus due to the conventional technology is collided, the collision force is concentrated on the side surface of the battery pack and the efficient cushioning effect cannot be achieved.

In consideration of the above circumstances, the present disclosure provides a battery protection apparatus fixed to a vehicle body and provided on a side surface of a battery pack. The battery protection apparatus includes a first portion configured to be inclined toward the battery pack side from a lower side to an upper side; an extension portion configured to extend from a lower end of the first portion in a direction being apart from the battery pack; and a second portion provided between the first portion and the battery pack, wherein the first portion and the second portion form a hollow portion.

According to the above-described configuration, when the vehicle encounters the collision by the curbstone or the protrusions on the ground, the battery protection apparatus is configured to effectively transmit the collision force to the extension portion and absorb the collision energy by the deformation of the extension portion and the hollow portion so as to suitably protect the battery pack. The extension portion is disposed at the lower end of the first portion such that when the collision occurs, the extension portion receives the collision force to move toward the lower side of the first portion. At the same time, the first portion is inclined toward the battery pack side from the lower side to the upper side such that the first portion receives the pressing force by the extension portion and also moves toward the lower side of the battery pack. As a result, both the hollow portion and the extension portion receives the collision force to moves downward, and it is possible to avoid the situation in which the battery protection apparatus directly collides with the side surface of the battery pack and the collision force is concentrated on the side surface thereof.

According to an aspect, the battery protection apparatus may have a lower surface being lower than a lower surface of the battery pack.

According to the above-described configuration, when the vehicle encounters the collision, it is easier for the battery protection apparatus to move toward the lower side of the battery pack and thoroughly protect the portion of the battery pack protruding downward.

According to an aspect, the battery protection apparatus may further include a connection member provided at the battery protection apparatus side, wherein the battery protection apparatus may be fixed to the vehicle body by the connection member.

According to the above-described configuration, the battery protection apparatus is fixed to the vehicle body by the connection member to increase the connection points between the battery protection apparatus and the vehicle body so as to improve the strength and stability of the battery protection apparatus and disperse the collision force to the vehicle body.

According to an aspect, the battery protection apparatus may further include a connection portion disposed at an intermediate portion of the battery protection apparatus at the battery pack side, wherein the battery protection apparatus may be fixed to the vehicle body by the connection portion.

According to the above-described configuration, the intermediate portion of the battery protection apparatus is fixed to the vehicle body so as to increase the connection points between the battery protection apparatus and the vehicle body and prevent the battery protection apparatus from dropping therefrom when the collision force received by the intermediate portion is excessively large. The connection member is fixed to the vehicle body such that it is possible to transmit and disperse the collision force to the vehicle body.

According to an aspect, the connection portion may be disposed at an upper side of a fixation portion on the side surface of the battery pack, and the connection portion and the fixation portion may be fixed to the vehicle body at a same fixation point.

According to the above-described configuration, it is possible to suitably transmit the collision force to the vehicle body so as to disperse the force on the side surface of the battery pack while reducing the fixation points by the fixation method.

According to an aspect, the battery protection apparatus may further include a third portion disposed at a lower side of a fixation portion disposed on the side surface of the battery pack, wherein the third portion may be positioned between the fixation portion and the extension portion.

According to the above-described configuration, the third portion is capable of filling the gap between the fixation portion and the extension portion so as to reduce the distance between the battery pack and the battery protection apparatus. At the time of attaching the battery protection apparatus to the lower portion of the vehicle body, the battery protection apparatus does not displace in the vertical up-down direction such that it is possible to provisionally fix the battery protection apparatus to the side surface of the battery pack more suitably and improve the convenience of the attachment.

According to an aspect, the third portion may include a standing portion disposed between the fixation portion and the hollow portion.

According to the above-described configuration, the standing portion is capable of filling the gap between the fixation portion and the hollow portion. At the time of attaching the battery protection apparatus to the lower portion of the vehicle body, the battery protection apparatus does not displace in the horizontal left-right direction such that it is possible to provisionally fix the battery protection apparatus to the side surface of the battery pack more suitably and improve the convenience of the attachment.

According to an aspect, the extension portion may include a flange formed at an end being apart from the battery pack and extends upward.

According to the above-described configuration, the flange is bent to extend upward such that the extension portion moves to the lower side of the battery pack when the extension portion encounters the collision. Accordingly, the collision force is transmitted to the hollow portion and the hollow portion receives the collision force to disperse the force received by the side surface of the battery pack.

According to an aspect, the first portion may include an inclination portion and a lower end portion positioned under the inclination portion, and the extension portion may be connected with the lower end portion.

According to the above-described configuration, it is easy to connect the extension portion to the first portion.

According to an aspect, the second portion may include a vertical portion and a horizontal portion positioned under the vertical portion, and the vertical portion, the horizontal portion, and the first portion may form the hollow portion having a cross section in a substantial triangle shape.

According to the above-described configuration, the hollow portion having the cross section in the substantial triangle shape is relatively stable. When the vehicle encounters the collision, the hollow portion disperses the collision force and absorbs the collision energy so as to reduce the impact to the battery pack due to the collision.

Another object of the present disclosure is to provide a vehicle including a vehicle body; a battery pack provided in the vehicle body; and the battery protection apparatus according to claim 1. The battery protection apparatus is fixed to the vehicle body and disposed on a side surface of the battery pack.

According to the above-described configuration, when the rear side of the vehicle encounters the collision by the curbstone or the protrusions on the ground, it is possible to effectively transmit the collision force to the hollow portion and absorb the collision energy by the hollow portion so as to suitably protect the battery pack.

A further object of the present disclosure is to provide an attachment method for a battery protection apparatus, wherein the battery protection apparatus includes a first portion configured to be inclined toward the battery pack side from a lower side to an upper side; an extension portion configured to extend from a lower end of the first portion in a direction being apart from the battery pack; and a second portion provided between the first portion and the battery pack, the first portion and the second portion forming a hollow portion. The attachment method includes a step S1 of disposing the hollow portion on a side surface of the battery pack; a step S2 of fixing the extension portion to the hollow portion to form the battery protection apparatus; and a step S3 of fixing the battery protection apparatus and the battery pack to the vehicle body.

According to the above-described attachment method for a battery protection apparatus, it is possible to make the structure of the battery protection apparatus to be simple and make it easy to attach the battery protection apparatus.

According to an aspect, the battery protection apparatus may further include a connection portion and a third portion, the connection portion being positioned at an upper side of the first portion, and the third portion being positioned between the connection portion and the extension portion. In the step S1, it is possible to connect the hollow portion and the connection portion to form a first assembly and disposing the first assembly on the side surface of the battery pack, in the step S2, it is possible to dispose the third portion at a lower side of the connection portion and dispose the extension portion at a lower side of the third portion, and fix the extension portion to the hollow portion to form the battery protection apparatus, and in the step S3, it is possible to dispose the battery pack and the battery protection apparatus under the vehicle body and fix the battery pack and the battery protection apparatus to the vehicle body.

According to the above-described attachment method for a battery protection apparatus, the battery protection apparatus can be provisionally fixed to the battery pack such that during the movement or the attachment process, the battery protection apparatus does not displace and it is easy to attach the battery protection apparatus and the battery pack to the vehicle body.

Advantageous Effects of Invention

According to the battery protection apparatus and the vehicle disclosed in above-described aspects, at least the following effects can be achieved.

When the vehicle encounters the collision by the curbstone or the protrusions on the ground, the extension portion is bent and deformed to absorb the majority of the collision force. At the same time, when the extension portion moves toward the lower side of the battery pack, the first portion and the second portion also move toward the lower side of the battery pack such that it is possible to avoid the situation in which the collision force is concentrated on the side surface of the battery pack. The extension portion is configured to transmit the collision force to the hollow portion and absorb the collision force due to the deformation of the hollow portion. Next, the collision force is transmitted to the second portion via the connection portion of the first portion and the second portion such that the force received by the side surface of the battery pack is dispersed. The extension portion is disposed at the lower end of the first portion such that when the collision occurs, the extension portion receives the force to move to the lower side of the first portion. The first portion is inclined toward the battery pack side from the lower side toward the upper side such that the first portion moves toward the pressing of the extension portion to move toward the lower side of the battery pack. Accordingly, the hollow portion and the extension portion move downward when encountering the collision so as to avoid the situation in which the collision force is concentrated on the side surface thereof due to the direct collision to the side surface of the battery pack where the battery protection apparatus is disposed and thus suitably protect the battery pack.

DESCRIPTION OF EMBODIMENTS

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations described in the figures are only specific examples of the present application and a person with ordinary skill in the art can achieve other figures based on the enclosed figures of the present application.

In the following description, unless otherwise defined, the terms "attach", "communicate", "connect" or the like should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

In the following description, it is noted that the terms "upper", "lower", "front", and "rear" should be understood with reference to the vehicle. For example, the term "upper" refers to the direction toward the roof portion of the vehicle, the term "lower" refers to the direction toward the bottom portion of the vehicle, the term "front" refers to the direction toward the vehicle head, and the term "rear" refers to the direction toward the vehicle tail. Such terms are only used to easily describe the directions and positional relationships based on the enclosed figures. Such terms are not used to indicate or implicit the apparatus and the element thereof have the particular directions and positions, to be configured and operated in the particular directions and at the specific positions, such that the present disclosure is not limited by these terms. For a person with ordinary skill in the art, the specific meaning of the above-mentioned terms may be suitably understood according to the actual situation.

The terms "first", "second", and "third" are only used for making the description easy to understand, and they are not used to indicate or implicit the importance of the configurations or implicit the amount of the technical features. Unless otherwise defined, the term "a plurality of" means that an amount equal to two or more than two.

A configuration of a battery protection apparatus according to the present disclosure will be described in details based on a specific embodiment.

Figure 1:
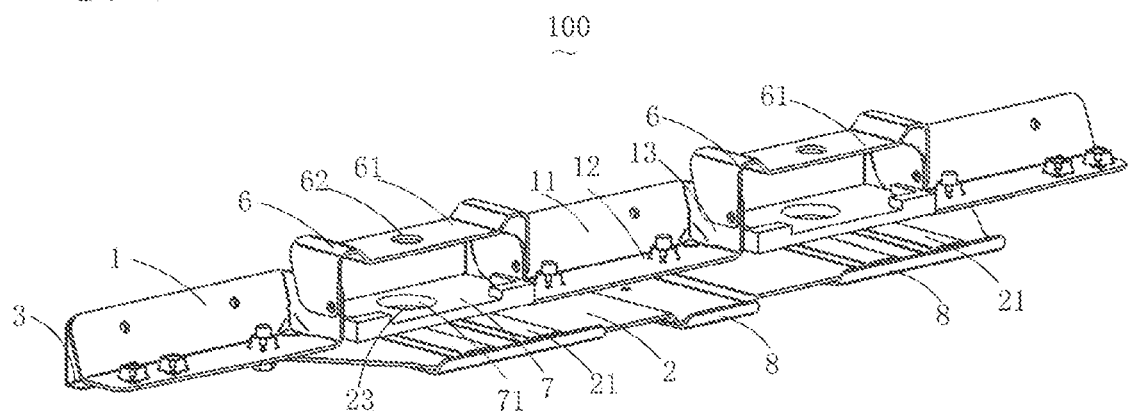
FIG. 1 is a view showing a three-dimensional structure of a battery protection apparatus according to an embodiment of the present disclosure.
Figure 2:
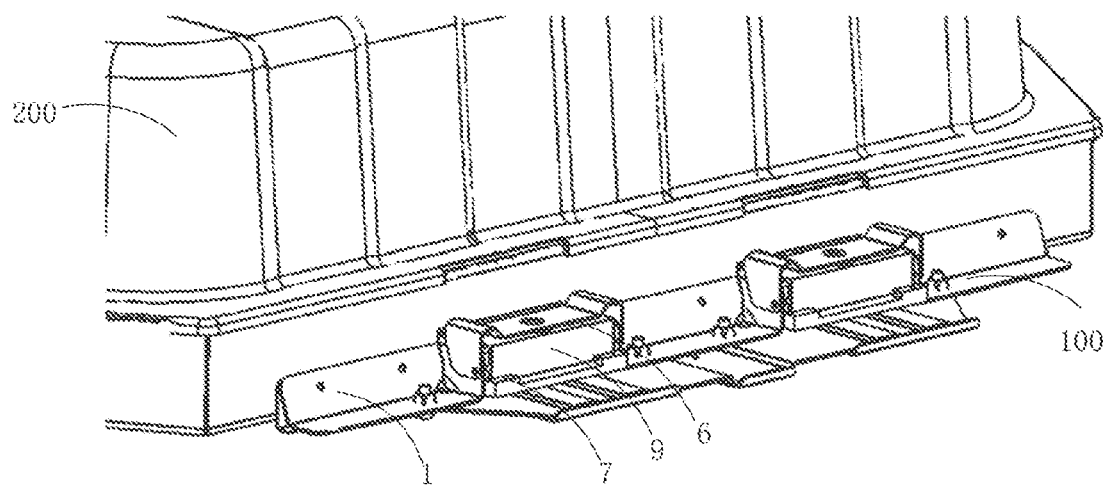
FIG. 2 is a view showing the battery protection apparatus attached to a vehicle body according to the embodiment of the present disclosure.

As shown in FIG. 1 and FIG. 2, a battery protection apparatus 100 according to an embodiment of the present disclosure is fixed to a vehicle body and disposed on an arbitrary side surface of a battery pack 200. Here, the arbitrary side surface includes the left, right, front, rear, top, and bottom surface of the battery pack 200. The terms "left", "right", "front", "rear", "top", and "bottom" are based on the directions of the vehicle disposed in the horizontal direction. For example, when the battery protection apparatus 100 is disposed on the rear surface of the battery pack 200, it is possible that the protrusions on the ground that are higher than the battery pack 200 collide with the rear surface of the battery pack 200 when the vehicle moves backward. By providing the above-described battery protection apparatus 100 on the rear surface, the protrusions on the ground collides with the battery protection apparatus 100 at first such that it is possible to reduce the collision force so as to protect the rear surface of the battery pack 200. According to the same manner, by providing the battery protection apparatus 100 on the front surface of the battery pack 200, it is possible to protect the front surface of the battery pack 200 when the vehicle moves forward.

The battery protection apparatus 100 includes a first portion 1, an extension portion 2, and a second portion 3. The first portion 1 is inclined toward the battery pack 200 side from a lower side toward an upper side. More specifically, a lower end of the first portion 1 is disposed to be apart away from the battery pack 200, and an upper end of the first portion is disposed to be close to the battery pack 200. The extension portion 2 is connected to the lower end of the first portion 1, and the extension portion 2 extends along a direction being away with respect to the battery pack 200 from the lower end of the first portion 1. The second portion 3 is disposed between the first portion 1 and the battery pack 200. The first portion 1 and the second portion 3 form a hollow portion. More specifically, a cross section of the hollow portion may have a triangle shape, a square shape, a rhombus shape, or a shape similar to the three shapes; however, the hollow portion is not limited to such shapes.

An operating principle of the battery protection apparatus 100 according to the present embodiment will be described below.

The battery protection apparatus 100 is disposed on the rear surface of the battery pack 200, and when the battery protection apparatus 100 encounters the collision by the protrusions on the ground from the rear side, the extension portion 2 encounters the collision at first. The extension portion 2 is connected to the lower end of the first portion 1 such that the extension portion 2 receives the collision force and transmits the collision force to the lower end of the first portion 1 to displace the lower end of the first portion 1 toward the front side. At this time, the lower end of the first portion 1 displaces to substantially swing with the upper end of the first portion 1 as the fulcrum. The lower end of the first portion 1 is positioned at a high point before the collision; however, after the collision, the lower end of the first portion 1 is positioned at a low point to cause the extension portion 2 to move downward and avoid the situation in which the force applied to the battery protection apparatus 100 is concentrated on the side surface of the battery pack 200.

According to the above-described configuration, when the vehicle encounters the collision due to the curbstone or the protrusions on the ground and the like, the battery protection apparatus 100 is configured to effectively transmit the collision force to the hollow portion via the extension portion 2 and absorb the collision energy due to the deformation of the extension portion 2 and the hollow portion so as to effectively protect the battery pack 200. The extension portion is disposed at the lower end of the first portion 1 such that when the collision occurs, the extension portion 2 receives the collision force and moves toward the lower side of the first portion 1. The first portion 1 is inclined toward the battery pack 200 side from the lower side toward the upper side, thus the first portion 1 moves toward the lower side of the battery pack 200 by receiving the pressing from the extension portion 2. Both the hollow portion and the extension portion 2 move downward after encountering the collision such that it is possible to avoid the situation in which the protrusions on the ground directly collide with the side surface of the battery pack 200 on which the battery protection portion 100 is disposed and the collision force is concentrated on the side surface thereof.

More specifically, the second portion 3 may be disposed at the intermediate portion, a top portion, or a bottom portion of the side surface of the battery pack 200. By disposing the second portion 3 at different positions on the side surface of the battery pack 200, since the height of the battery protection apparatus 100 varies, the protection performance provided by the battery protection apparatus 100 is different. When the height of the battery protection apparatus 100 with respect to the ground increases, the height of protrusions on the ground that are possible to collide with the battery protection apparatus 100 becomes higher. Accordingly, it is impossible to prevent the protrusions on the ground that are relative low with respect to the ground from colliding with the battery pack 200. Thus, it is preferable that the second portion 3 is disposed at the bottom portion on the side surface of the battery pack 200. The extension portion 2 is disposed by being apart from the torsion beam of the vehicle body, in other words, the extension portion 2 is disposed at a position being apart from the torsion beam with a predetermined distance such that the torsion beam does not interfere with the extension portion 2 when the torsion beam vibrates.

Figure 3:
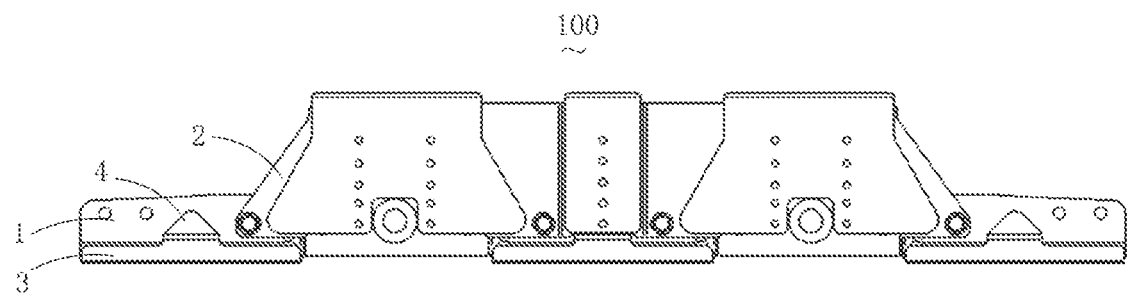
FIG. 3 is a bottom view of the battery protection apparatus according to the embodiment of the present disclosure.

As shown in FIG. 3, the battery protection apparatus 100 further includes a protrusion portion 4 for connecting the first portion 1 and the second portion 3. When the collision occurs, the collision force is transmitted to the second portion 3 by the protrusion portion 4 to disperse the force received by the battery pack 200. More specifically, the protrusion portion 4 may be integrally formed with the second portion 3.

In an example, the lower surface of the battery protection apparatus 100 is lower than the lower surface of the battery pack 200. More specifically, each of the lower surfaces of the first portion 1, the extension portion 2, and the second portion 3 is lower than the lower surface of the battery pack 200, or either of the lower surfaces of the first portion 1, the extension portion 2, and the second portion 3 is lower than the lower surface of the battery pack 200. It should be described that when the battery protection apparatus 100 encounters the collision, since the lower surface of the battery protection apparatus 100 is lower than the lower surface of the battery pack 200, the bottom portion of the battery protection apparatus 100 and the bottom portion of the battery pack 200 are in a misaligned state with each other. The bottom portion of the battery protection apparatus 100 being misaligned with the battery pack 200 cannot receive the support of the battery pack 200, thus a relatively large displacement occurs when the collision occurs and it is easy for the bottom portion of the battery protection apparatus 100 to move toward the lower side of the battery pack 200.

According to the above-described configuration, when the vehicle encounters the collision, it is easy for the battery protection apparatus 100 to move toward the lower side of the battery pack 200 and thoroughly protect the portion of the battery pack protruding downward.

Figure 4:
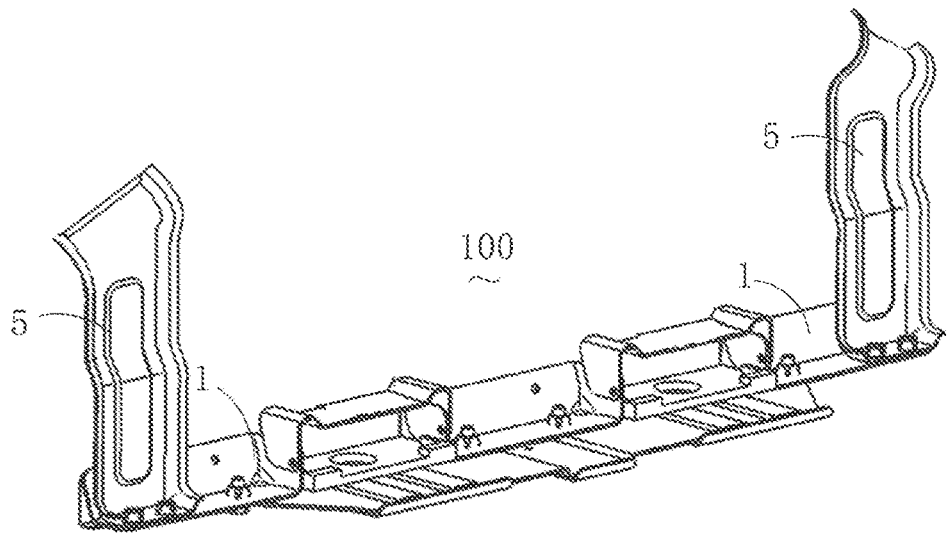
FIG. 4 is a view showing the three-dimensional structure of the battery protection apparatus (with a connection member) according to the embodiment of the present disclosure.

As shown in FIG. 4, in an example, the battery protection apparatus 100 further includes a connection member 5 at the battery protection apparatus 100 side, and the battery protection apparatus 100 is connected to the vehicle body by the connection member 5. More specifically, the connection member 5 is connected to the first portion 1 and the reinforcing pillar of the vehicle body.

According to the above-described configuration, the battery protection apparatus 100 is fixed to the vehicle body by the connection member 5 so as to increase the connection points between the battery protection apparatus 100 and the vehicle body. Accordingly, it is possible to improve the strength and the stability of the battery protection apparatus 100 while transmitting and dispersing the collision force to the vehicle body.

It is more preferable that the battery protection apparatus 100 includes at least two connection members 5, and the two connection members 5 are disposed at the two sides of the battery protection apparatus 100 and connected to the first portion 1. By providing at least two connection members 5, it is possible to further improve the strength and the stability of the battery protection apparatus 100.

Referring to FIG. 1 again, in an example, the battery protection apparatus 100 includes a connection portion 6 in the intermediate portion of the battery protection apparatus 100 close to the battery pack 200 side, and the battery protection apparatus 100 is connected to the vehicle body by the connection portion 6.

According to the above-described configuration, the intermediate portion of the battery protection apparatus 100 is connected to the vehicle body via the connection portion 6 so as to increase the connection points between the battery protection apparatus 100 and the vehicle body while preventing the battery protection apparatus 100 from dropping due to the collision force received at the intermediate portion being excessively large. The connection portion 6 is fixed to the vehicle body so as to transmit and disperse the collision force to the vehicle body.

It is more preferable that the battery protection apparatus 100 includes at least two connection portions 6 and the two connection portions 6 are disposed between the two connection members 5. According to the above-described configuration, it is possible to further improve the strength and the stability of the battery protection apparatus 100.

Furthermore, a concave structure 61 being recessed toward the extension portion 2 is formed in the upper portion of the connection portion 6. Comparing with the case in which the upper portion of the connection portion 6 is formed in a planar structure, by forming the concave structure 61, the mechanical strength of the connection portion 6 is improved. Also, it is possible to increase the manufacturing dimensional tolerance of the connection portion 6 so as to make the connection portion 6 to be easily connected with the two adjacent first portions 1.

Referring to FIG. 2 again, in an example, a fixation portion 9 is formed in the side surface of the battery pack 200. The connection portion 6 is disposed at the upper side of the fixation portion 9 on the side surface of the battery pack 200. The connection portion 6 and the fixation portion 9 are fixed to the vehicle body at the same fixation point. More specifically, the connection portion 6 and the fixation portion 9 are fixed to the reinforcing pillar of the vehicle body at the same fixation point.

According to the above-described configuration, in the present fixation method, it is possible to reduce the number of the fixation points, more suitably transmit the collision forcer to the vehicle body and disperse the force received by the side surface of the battery pack 200.

In an example, the battery protection apparatus 100 further includes a third portion 7 positioned at the lower side of the fixation portion 9 on the side surface of the battery pack 200. The third portion 7 is positioned between the fixation portion 9 and the extension portion 2. More specifically, the third portion 7 is formed from the foaming material or the elastic material, and it is more preferable that the third portion 7 is formed from the polypropylene foam material.

According to the above-described configuration, the third portion 7 is capable of filling the gap between the fixation portion 9 and the extension portion 2. Accordingly, it is possible to decrease the distance between the battery pack 200 and the battery protection apparatus 100 and there is no displacement of the battery protection apparatus 100 in the vertical up-down direction when the battery protection apparatus 100 is attached to the lower side of the vehicle body. As a result, it is possible to provisionally fix the battery protection apparatus 100 on the side surface of the battery pack 200 more suitably to improve the convenience of the attachment.

Figure 5:
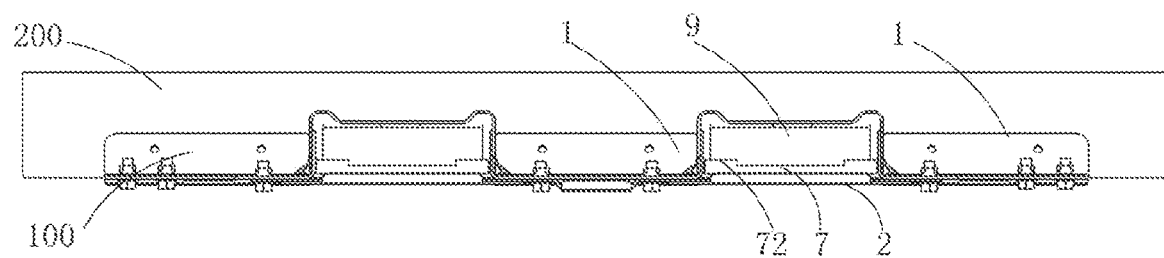
FIG. 5 is a front view of the battery protection apparatus according to the embodiment of the present disclosure.

Referring to FIG. 5 together, according to the third portion 7, during the attachment step, after the battery protection apparatus 100 is provisionally fixed to the side surface of the battery pack 200, the battery pack 200 and the battery protection apparatus 100 are attached and fixed to the vehicle body together.

In the case in which the third portion 7 is not provided, there is the gap existing between the side surface of the fixation portion 9 and the side surface of the hollow portion. When the battery pack 200 and the battery protection apparatus 100 are moved, the battery protection apparatus 100 may move in the vertical up-down direction or the horizontal left-right direction due to the existence of the gap such that it is necessary to determine the position of the battery protection apparatus 100 at the time of fixing the battery protection apparatus 100 to the vehicle body.

Accordingly, by providing the third portion 7 between the fixation portion 9 and the extension portion 2 and disposing the standing portion 72 on the side surface of the third portion 7, the third portion 7 is capable of filling the gap between the fixation portion 9 and the extension portion 2. The standing portion 72 is capable of filling the gap between the side surface of the fixation portion 9 and the side surface of the hollow portion. Accordingly, it is possible to provisionally fix the battery protection apparatus 100 to the battery pack 200, and there is not any displacement of the battery protection apparatus 100 in the vertical up-down direction or the horizontal left-right direction with respect to the battery pack 200 during the movement and the attachment.

It should be further described that during the attachment step of the battery protection apparatus 100, the attachment personnel attaches the connection member 5 and the torsion beam at first. Accordingly, during the attachment step, the attachment personnel inserts the battery protection apparatus 100 into the gap between the battery pack 200 and the torsion beam. That is, in order to secure the distance between the extension portion 2 and the torsion beam, it is necessary to determine the position of the extension portion 2 when attaching the battery protection apparatus 100 to the vehicle body.

In an example, the length of the third portion 7 is smaller than the distance between the two adjacent first portions 1. At the time of attaching the third portion 7, the third portion 7 may be disposed between the two adjacent first portions 1.

In another example, the length of the third portion 7 may be larger than the distance between the two adjacent first portions 1. The third portion 7 has a certain elasticity such that it is possible to dispose the third portion 7 between the two first portions 1 by pressing the third portion 7 therebetween. Thus, it is possible to realize the interference fit between the third portion 7 and the first portion 1.

It should be further described that the thickness of the third portion 7 is larger than the gap between the fixation portion 9 and the extension portion 2 during the attachment. The third portion 7 is formed from the elastic material such as the polypropylene foam material such that it is possible to fix the third portion 7 between the fixation portion 9 and the extension portion 2 due to the elastic deformation. According to the above-described configuration, it is possible to decrease the distance between the fixation portion 9 and the extension portion 2 as much as possible and reduce the dimensional tolerance at the time of manufacturing the fixation portion 9 and the extension portion 2.

Referring to FIG. 1 again, in an example, the extension portion 2 includes a flange 8 provided at one end being apart from the battery pack 200 and extending upward. More specifically, the flange 8 may be integrally formed with the extension portion 2, or the flange 8 may be formed by extending the end of the extension portion 2 being apart from the battery pack 200 upward.

It should be further described that when the protrusions on the ground collide with the flange 8, the flange is formed to extend upward such that the flange 8 receives the collision force to cause the extension portion 2 to be bent and deformed downward rather than causing the extension portion 2 to be bent and deformed upward. Accordingly, the extension portion 2 may move toward the lower side of the battery pack 2 to disperse the force received by the side surface of the battery pack 200.

According to the above-described configuration, when the extension portion 2 receives the collision, the flange 8 is bent upward to cause the extension portion 2 to move toward the lower side of the battery pack 200 and the collision force is transmitted to the hollow portion. The hollow portion receives the collision force to disperse the force received by the side surface of the battery pack 200.

Furthermore, the extension portion 2 at least includes two flanges 8 and one of the two flanges 8 is positioned at the intermediate portion of the battery protection apparatus 100. The object is to absorb part of the collision force by the flange 8 being disposed at the intermediate portion when the intermediate portion of the battery protection apparatus 100 receives the collision. Another flange 8 is disposed to be opposite to the fixation portion 9 of the battery pack 200, and the object is to protect the fixation portion 9 of the battery pack 200 by reducing the collision force.

In an example, the extension portion 2 includes a reinforcing structure 21. The reinforcing structure 21 may be formed to protrude from the surface of the extension portion 2, or the reinforcing structure 21 may be formed by the extension portion 2 itself being pressed and bent. The reinforcing structure 21 is formed that the length direction thereof is parallel to the extending direction of the extension portion 2 to increase the mechanical strength of the extension portion 2 in the extending direction and the extension portion 2 can withstand a larger collision force. It should be further understood that by providing the reinforcing structure 21, the extension portion 2 can withstand a larger collision force and more suitably protect the side surface of the battery pack 200.

Figure 6:
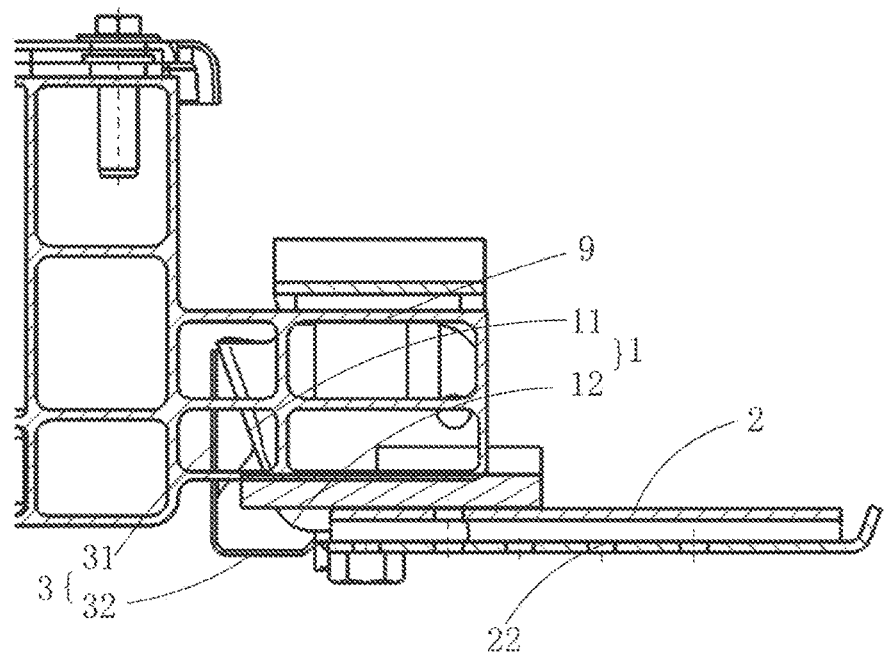
FIG. 6 is a cross-sectional view of the battery protection apparatus according to the embodiment of the present disclosure.

As shown in FIG. 6, a plurality of drain holes 22 are arranged in an array along the extending direction of the extension portion 2. By providing the plurality of drain holes 22 in the extension portion 2, it is possible to prevent the sewage from accumulating in the extension portion 2 and prevent the battery protection apparatus 100 and the other members from being corroded.

Referring to FIG. 3 again, the extension portion 2 is formed in a trapezoidal structure. In the extension portion 2, the long side is close to the battery pack 200, and the short side is apart away from the battery pack, and the two lateral sides are disposed corresponding to the torsion beam of the vehicle. The torsion beam is configured to protect the two sides of the battery pack 200 from being collided by the protrusions on the ground such that it is only necessary to dispose the extension portion 2 in the intermediate portion of the battery pack 200. The two lateral sides are disposed to avoid the torsion beam so as to avoid the interference between the extension portion 2 and the torsion beam to secure the safety during the driving.

Referring to FIG. 1 again, a first manufacturing hole 23 is formed in the extension portion 2, a second manufacturing hole 71 is formed in the third portion 7, and a third manufacturing hole 62 is formed in the connection portion 6. The first manufacturing hole 23, the second manufacturing hole 71, and the third manufacturing hole 62 are disposed to be opposite to each other in the vertical up-down direction and it is easy to disassemble the three configurations from the vehicle body and attach the three configurations to the vehicle body. More specifically, it is possible to fix the battery protection apparatus 100 to the vehicle body by using the fastener to pass through the first manufacturing hole 23, the second manufacturing hole 71, the third manufacturing hole 62, and the manufacturing holes formed in the vehicle body together.

In an example, the first portion 1 includes an inclination portion 11 and a lower end portion 12 positioned at the lower side of the inclination portion 11. The extension portion 2 is connected with the lower end portion 12.

According to the above-described configuration, it is easy to connect the extension portion 2 with the first portion 1.

In an example, the second portion 3 includes a vertical portion 31 and a horizontal portion 32 positioned at the lower side of the vertical portion 31. The vertical portion 31, the horizontal portion 32, and the first portion 1 form the hollow portion having the cross section in the substantial triangle shape. More specifically, the vertical portion 31, the horizontal portion 32, the lower end portion 12, and the inclination portion 11 form the hollow portion having the cross section in the substantial triangle shape. It is more preferable that the protrusion portion 4 is disposed in the horizontal portion 32 and the horizontal portion 32 is connected with the lower end portion 12 via the protrusion portion 4 such that the second portion 3 is fixed to the first portion 1. Furthermore, the vertical portion 31 may be fixed and connected with the inclination portion 11, and the vertical portion 31 may be disposed to be apart from the inclination portion 11.

According to the above-described configuration, the hollow portion having the cross section in the substantial triangle shape is relatively stable. When the vehicle encounters the collision, the hollow portion in the triangle shape is configured to disperse the collision force and absorb the collision energy to reduce the impact to the battery pack 200 due to the collision.

In an example, the extension portion 2 is fixed to the first portion 1 at the long side. It is more preferable that there are a plurality of fixation points provided in the long side of the extension portion for fixing the extension portion 2 to the lower end portion 12 of the first portion 1.

In an example, the battery protection apparatus 100 includes the first portion 1, the extension portion 2, the second portion 3, the protrusion portion 4, the connection member 5, the connection portion 6, the third portion 7, and the flange 8. The first portion 1 is inclined toward the battery pack 200 side from the lower side to the upper side. The extension portion 2 is connected to the lower portion 12 of the first portion 1 by the fastener, and the extension portion 2 extends in a direction apart from the battery pack 200 from the lower end of the first portion 1. The extension portion 2 is formed in the trapezoidal shape. The reinforcing structure 21 protruding from the extension portion 2 is provided. The plurality of drain holes 22 are sequentially arranged in the extension portion 2 along the extending direction of the extension portion 2. The third portion 3 is disposed between the first portion 1 and the battery pack 200. The first portion 1 and the third portion 3 form the hollow portion. The protrusion portion 4 may be integrally formed with the second portion 3 for connecting the first portion 1 and the second portion 4. The connection members 5 are disposed at the two ends of the battery protection apparatus 100, and the battery protection apparatus 100 is fixed to the vehicle body by the connection member 5. The two connection portions 6 are positioned in the intermediate portion at the battery pack 200 side in the battery protection apparatus 100. More specifically, the two connection portions 6 connect the three hollow portions and fix the three hollow portions to the vehicle body. More specifically, the first portion 1 includes the inclination portion 11, the lower end portion 12, and the connection portion 13, wherein the inclination portion 11 is formed to be inclined, the lower end portion 12 is positioned at the lower side of the inclination portion 11 and connected to the inclination portion 11, and the connection portion 13 is positioned at the two sides of the inclination portion 11 and connected to the inclination portion 11. The connection portion 13 is configured to be connected to the connection portion 6. The third portion 7 is disposed at the lower side of the fixation portion 9 on the side surface of the battery pack 200, and positioned between the fixation portion 9 and the extension portion 2. The flange 8 is disposed to extend upward, and disposed at the end of the extension portion 2 that is apart from the battery pack 200.

The battery protection apparatus 100 according to the present embodiment at least has the following effects.

Then the protrusions on the ground collide with the battery protection apparatus 100, the flange 8 receives the collision force at first. The flange 8 is disposed to extend upward such that the flange 8 receives the collision force to make the extension 2 to be bent and deformed so as to absorb the majority of the collision force. At the same time, the extension portion 2 moves toward the lower side of the battery pack 200 such that the first portion 1 and the second portion 3 are also caused to move toward the lower side of the battery pack 200, thus it is possible to avoid the situation in which the collision force is concentrated on the side surface of the batter pack. Next, when the collision occurs, the collision force is transmitted to the second portion 3 via the protrusion portion 4 and the collision force received by the battery pack 200 is dispersed. The hollow portion formed by the first portion 1 and the second portion 3 absorb part of the collision force. Furthermore, the battery protection apparatus 100 is fixed to the vehicle body via the connection member 5 so as to increase the connection points between the battery protection apparatus 100 and the vehicle body to increase the strength and the stability of the battery protection apparatus 100 while dispersing the collision force to the vehicle body. Furthermore, the intermediate portion of the battery protection apparatus 100 is fixed to the vehicle body by the connection portion 6 so as to increase the connection points between the battery protection apparatus 100 and the vehicle body while preventing the battery protection apparatus 100 from dropping when the collision force received by the intermediate portion becomes excessively large. The connection portion 6 is fixed to the vehicle body so as to disperse the collision force to the vehicle body. At last, the third portion 7 is configured to fill the gap between the fixation portion 9 and the extension portion 2 to decrease the distance between the battery pack 100 and the battery protection apparatus 100 while provisionally fixing the battery protection apparatus 100 to the side surface of the battery pack 200. When the battery protection apparatus 100 is attached to the lower side of the vehicle body, there is not any displacement of the battery protection apparatus 100 and the convenience of the attachment is improved.

Another embodiment of the present disclosure provides a vehicle including a vehicle body, the battery pack 200 provided in the vehicle body, and the above-described battery protection apparatus 100. The battery protection apparatus 100 is fixed to the vehicle body and disposed at the arbitrary side surface of the battery pack 200.

According to the above-described configuration, when the rear side of the vehicle is collided by the curbstone or the protrusions on the ground, the collision force can be effectively transmitted to the hollow portion. The collision energy is absorbed by the hollow portion so as to effectively protect the battery pack 200.

A further embodiment of the present disclosure provides an attachment method for the battery protection apparatus 100. The battery protection apparatus 100 includes the first portion 1, the extension portion 2, and the second portion 3. The first portion 1 is inclined toward the battery pack 200 side from the lower side toward the upper side. The extension portion 2 is connected to the lower end of the first portion 1, and the extension portion 2 extends along a direction being away with respect to the battery pack 200 from the lower end of the first portion 1. The second portion 3 is disposed between the first portion 1 and the battery pack 200. The first portion 1 and the second portion 3 form the hollow portion. The attachment method for the battery protection apparatus 100 includes the following steps, that is, a step S1 of disposing the hollow portion on the arbitrary side surface of the battery pack 200, a step S2 of fixing the extension portion 2 to the hollow portion to form the battery protection apparatus 100, and a step S3 of fixing the battery protection apparatus 100 and the battery pack 200 to the vehicle body.

According to the above-described attachment method for the battery protection apparatus 100, it is possible to simplify the structure of the battery protection apparatus 100 and make it easy to attach the battery protection apparatus 100 thereto.

In an example, the battery protection apparatus 100 further includes the connection portion 6 and the third portion 7, wherein the connection portion 6 is positioned at the upper side of the first portion 1, and the third portion 7 is positioned between the connection portion 6 and the extension portion 2. The attachment method for the battery protection apparatus 100 includes the following steps, that is, the step S1 of connecting the hollow portion and the connection portion 6 to forma first assembly and disposing the first assembly to the arbitrary side surface of the battery pack 200, the step S2 of disposing the third portion 7 at the lower side of the connection portion 6, disposing the extension portion 2 at the lower side of the third portion 7, and fixing the extension portion 2 to the hollow portion to form the battery protection apparatus 100, and the step S3 of disposing the battery pack 200 and the battery protection apparatus 100 at the lower side of the vehicle body and fixing the battery pack 200 and the battery protection apparatus 100 to the vehicle body.

In an example, the battery protection apparatus 100 further includes two connection members 5 provided at the two sides of the hollow portion. The attachment method for the battery protection apparatus 100 includes the following steps, that is, the step S1 of attaching the connection members 5 to the bottom portion of the vehicle body, the step S2 of attaching the torsion beam to the bottom portion of the vehicle body, the step S3 of connecting the hollow portion and the connection portion 6, the step S4 of disposing the third portion 7 on the lower side of the fixation portion 9, disposing the extension portion 2 on the lower side of the third portion 7, and then using the fastener to fix the extension portion 2 on the lower side of the first portion 1, and the step S5 of disposing the battery pack 200 and the battery protection apparatus 100 on the lower side of the vehicle body and fixing the whole battery protection apparatus 100 to the vehicle body by fixing the connection portion 6 to the vehicle body using the fastener and fixing the first portion 1 with the connection member 5.

In the step S3 of connecting the hollow portion and the connection portion 6, more specifically, the two connection portions 6 are used to connect the three hollow portions to assemble the first assembly. More specifically, the side surface of the hollow portion is connected to the side surface of the connection portion 6, and another side surface of the connection portion 6 is connected to the side surface of another hollow portion, and then the connection portion 6 is disposed on the upper side of the fixation portion 9 on the side surface of the battery pack 200.

In the step S4 described above, the third portion 7 is configured to fill the gap between the fixation portion 9 and the extension portion 2 and the gap between the fixation portion 9 and the hollow portion such that it is possible to provisionally fix the battery protection apparatus 100 on the side surface of the battery pack 200.

According to the above-described attachment method for the battery protection apparatus 100, it is possible to provisionally fix the battery protection apparatus 100 to the battery pack 200. During the movement or the attachment process, there is no displacement to the battery protection apparatus 100 such that it is easy and convenience to attach the battery protection apparatus 100 and the battery pack 200 to the vehicle body.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST

- 100 battery protection apparatus
- 200 battery pack
- 1 first portion
- 2 extension portion
- 3 second portion
- 4 protrusion portion
- 5 connection member
- 6 connection portion
- 7 third portion
- 8 flange
- 9 fixation portion
- 11 inclination portion
- 12 lower end portion
- 13 connection portion
- 21 reinforcing structure
- 22 drain hole
- 23 first manufacturing hole
- 31 vertical portion
- 32 horizontal portion
- 61 concave structure
- 62 third manufacturing hole
- 71 second manufacturing hole
- 72 standing portion

What is claimed is:

1. A battery protection apparatus fixed to a vehicle body and provided on a side surface of a battery pack, comprising:
   a first portion configured to be inclined toward a battery pack side from a lower side to an upper side;
   an extension portion configured to extend from a lower end of the first portion in a direction being apart from the battery pack; and
   a second portion provided between the first portion and the battery pack,
   wherein the first portion and the second portion form a hollow portion,
   wherein the battery protection apparatus further includes a third portion disposed at a lower side of a fixation portion disposed on the side surface of the battery pack, and
   wherein the third portion is positioned between the fixation portion and the extension portion.

2. The battery protection apparatus according to claim 1, wherein the battery protection apparatus has a lower surface being lower than a lower surface of the battery pack.

3. The battery protection apparatus according to claim 1, further includes a connection member provided at the battery pack side, wherein the battery protection apparatus is fixed to the vehicle body by the connection member.

4. The battery protection apparatus according to claim 1, further includes a connection portion disposed at an intermediate portion of the battery protection apparatus at the battery pack side, wherein the battery protection apparatus is fixed to the vehicle body by the connection portion.

5. The battery protection apparatus according to claim 4, wherein the connection portion is disposed at an upper side of the fixation portion on the side surface of the battery pack, and the connection portion and the fixation portion are fixed to the vehicle body at a same fixation point.

6. The battery protection apparatus according to claim 1, wherein the third portion includes a standing portion disposed between the fixation portion and the hollow portion.

7. The battery protection apparatus according to claim 1, wherein the extension portion includes a flange formed at an end being apart from the battery pack and extends upward.

8. The battery protection apparatus according to claim 1, wherein the first portion includes an inclination portion and a lower end portion positioned under the inclination portion, and the extension portion is connected with the lower end portion.

9. A vehicle, comprising:
   a vehicle body;
   a battery pack provided in the vehicle body; and
   the battery protection apparatus according to claim 1,
   wherein the battery protection apparatus is fixed to the vehicle body and disposed on a side surface of the battery pack.

10. An attachment method for a battery protection apparatus, wherein the battery protection apparatus includes a first portion configured to be inclined toward a battery pack side from a lower side to an upper side; an extension portion configured to extend from a lower end of the first portion in a direction being apart from the battery pack; and a second portion provided between the first portion and the battery pack, the first portion and the second portion forming a hollow portion, the attachment method comprising:
    a step S1 of disposing the hollow portion on a side surface of the battery pack;
    a step S2 of fixing the extension portion to the hollow portion to form the battery protection apparatus; and
    a step S3 of fixing the battery protection apparatus and the battery pack to the vehicle body,
    wherein the battery protection apparatus further includes a connection portion and a third portion, the connection portion being positioned at an upper side of the first portion, and the third portion being positioned between the connection portion and the extension portion,
    in the step S1, connecting the hollow portion and the connection portion to form a first assembly and disposing the first assembly on the side surface of the battery pack,
    in the step S2, disposing the third portion at a lower side of the connection portion and disposing the extension portion at a lower side of the third portion, and fixing the extension portion to the hollow portion to form the battery protection apparatus, and
    in the step S3, disposing the battery pack and the battery protection apparatus under the vehicle body and fixing the battery pack and the battery protection apparatus to the vehicle body.

11. A battery protection apparatus fixed to a vehicle body and provided on a side surface of a battery pack, comprising:
    a first portion configured to be inclined toward a battery pack side from a lower side to an upper side;
    an extension portion configured to extend from a lower end of the first portion in a direction being apart from the battery pack; and a second portion provided between the first portion and the battery pack, wherein the first portion and the second portion form a hollow portion, wherein the second portion includes a vertical portion and a horizontal portion positioned under the vertical portion, and the vertical portion, the horizontal portion, and the first portion form the hollow portion having a cross section in a substantial triangle shape.

* * * * *